United States Patent
Banks et al.

(10) Patent No.: US 7,925,553 B2
(45) Date of Patent: Apr. 12, 2011

(54) SYSTEM AND METHOD FOR PREPARING A TAX LIABILITY PROJECTION

(75) Inventors: David R. Banks, Little Elm, TX (US);
Jeffrey J. Harvey, Allen, TX (US);
Aaron H. Brady, McKinney, TX (US);
John P. Catrett, McKinney, TX (US)

(73) Assignee: Intuit Inc., Mountain View, CA (US)

( * ) Notice: Subject to any disclaimer, the term of this patent is extended or adjusted under 35 U.S.C. 154(b) by 1267 days.

(21) Appl. No.: 11/404,535

(22) Filed: Apr. 14, 2006

(65) Prior Publication Data
US 2007/0250418 A1    Oct. 25, 2007

(51) Int. Cl.
G06F 17/22    (2006.01)
(52) U.S. Cl. .......................................... 705/31; 705/30
(58) Field of Classification Search ............... 705/30–31
See application file for complete search history.

(56) References Cited

U.S. PATENT DOCUMENTS

| | | | |
|---|---|---|---|
| 5,884,283 A | 3/1999 | Manos | |
| 6,161,098 A | 12/2000 | Wallman | |
| 6,516,303 B1 | 2/2003 | Wallman | |
| 7,287,016 B2 * | 10/2007 | Johnson et al. | 706/47 |
| 7,539,635 B1 * | 5/2009 | Peak et al. | 705/31 |
| 2002/0107698 A1 * | 8/2002 | Brown et al. | 705/1 |
| 2002/0111888 A1 | 8/2002 | Stanley et al. | |
| 2002/0111946 A1 | 8/2002 | Fallon | |
| 2003/0217032 A1 | 11/2003 | Fritzler et al. | |
| 2005/0102283 A1 | 5/2005 | Anderson | |
| 2005/0154658 A1 | 7/2005 | Bove et al. | |
| 2005/0209939 A1 * | 9/2005 | Joseph et al. | 705/31 |
| 2007/0005461 A1 * | 1/2007 | Lenz | 705/31 |

* cited by examiner

*Primary Examiner* — Ramsey Refai
(74) *Attorney, Agent, or Firm* — Osha • Liang LLP

(57) ABSTRACT

A system for tax planning with legislation conformance options comprises one more processors coupled to a memory. The memory stores instructions executable by the processors to implement a tax planner configured to receive data exported from a tax return preparation tool. The tax planner receives input indicating whether a tax projection to be prepared using the data is to include an impact of specified tax legislation. If the input indicates that the tax projection is to include the impact of the specified legislation, the tax planner is configured to include the impact of the specified legislation in the tax projection without requiring data to be re-exported from the tax return preparation tool. If the input indicates that the tax projection is to exclude the impact of the specified legislation, the tax planner is configured to prepare the tax projection without including the impact of the specified legislation.

23 Claims, 6 Drawing Sheets

SYSTEM AND METHOD FOR PREPARING A TAX LIABILITY PROJECTION

BACKGROUND

The present invention is directed to computer systems. More particularly, it is directed to a computer-implemented tool and user interface for planning with conformance options.

Traditionally, managing finances has been a largely manual endeavor. In recent years, more and more individuals and small businesses have begun to use software tools to assist in various aspects of finance management and/or tax management. Such tools are relatively inexpensive, typically run on relatively affordable personal computers, and provide intuitive, easy-to-use interfaces that do not require extensive financial or software expertise. The finance management tools help to simplify and automate a variety of finance-related tasks, such as balancing checkbooks, managing investments, payrolls, sales and expenses, paying bills and the like, and the tax-related tools help users prepare tax returns, estimate future taxes, etc.

Tax-related software tools can be broadly classified into at least two categories: tax return preparation tools, and tax planning tools. Typically, tax return preparation tools are used to prepare and file tax returns for various tax jurisdictions; e.g., in the United States, federal income tax returns may be filed with the Internal Revenue Service, and state tax returns may be filed with one or more state revenue services corresponding to states in which the taxpayer resides or earns income during a particular tax period. Data used to prepare the tax returns (such as income from various sources, tax withholding amounts, deductions, etc.) is typically provided to the tax return preparation tool, either manually or via downloading. The tax return preparation tool helps the preparer to avoid common mistakes such as arithmetical errors, omitting to fill out a required portion of a tax form, forgetting to consider a tax deduction, etc. Given the complexity of tax regulations, tax preparation professionals or experts are often employed to prepare the tax returns, although non-professionals also use tax return preparation software in large numbers. The process of preparing a tax return often requires a non-trivial amount of time and effort, especially given the legal and financial penalties possible for filing incorrect tax returns. Typically, therefore, users of tax preparation software strongly prefer that a tax return that has already been prepared (and, for example, filed or at least checked for correctness) not be modified.

Tax planning tools typically offer users the ability to make projections or estimates for future tax liability (or refunds). For example, users may design various hypothetical scenarios for the future (e.g., an increase of 10% in one spouse's salary, an increase of 20% in another spouse's salary, and an increase of 5% in health-care costs compared to the current tax year), and quickly view the tax implications of the hypothetical scenarios. Professional tax preparers or accountants frequently use tax planners to help their clients prepare for future tax years, e.g., by taking specific tax-related actions such as changing contribution levels to tax-deferred accounts, modifying investment portfolios, etc. Some tax planner tools may allow users to choose among different modes of filing taxes—e.g., to compare the tax liability of a married couple in the United States based on filing income tax returns in the "Married Filing Jointly" mode or the "Married Filing Separately" mode. Typically, tax data that may be used to prepare a tax return for a particular tax period is exported from a tax return preparation tool to a tax planner tool, and the tax planner tool uses the exported data as well as the hypothetical scenarios to prepare tax projections, either for the same tax period or for future tax periods. Tax planner tools are usually designed to provide tax projections in real time: as soon as a user provides input specifying a change to a scenario, the tax planner tool is expected to immediately show the impact of the change, for example by highlighting a changed liability amount or refund amount, or generating a modified pie chart or graph.

Tax liabilities, possible refund amounts, etc., can be affected by tax legislation at various levels of government. Accordingly, tax-related software tools have to take tax legislation into account. Unfortunately, current tax planning software typically cannot easily isolate the impact of specific legislation on projected taxes. For example, a user may want to know how much of an impact a particular taxation-related piece of legislation has on the user's projected taxes for the next year, compared to the impact of a different taxation-related act, and there is usually no easy way for the user to do so. Furthermore, current tax planning tools typically require tax data that is to be used to prepare a tax projection to be recalculated and re-exported from a tax return preparation tool in order to determine the effect of enacted tax legislation. That is, to incorporate the effects of tax legislation changes, tax planning tools typically rely on tax return preparation tools, potentially leading to unexpected delays and additional work on the part of the user, and/or requiring undesired modifications of already-prepared tax returns, to generate tax projections.

SUMMARY

Various embodiments of systems and methods for financial (e.g., tax) planning with legislation conformance options are disclosed. According to one embodiment, program instructions for a tax planner tool may execute on a system comprising one more processors and memory coupled to the processors, where the memory stores the program instructions. The tax planner is configured to receive data exported from a tax return preparation tool, comprising, for example, various tax-related data elements that may be used to prepare a tax return, such as wages earned during a tax year, taxes withheld, etc. After receiving the exported data, the tax planner is configured to receive input indicating whether a tax projection to be prepared using the data is to include an impact of specified tax legislation. If the input indicates that the tax projection is to include the impact of the specified legislation, the tax planner is configured to include the impact in the tax projection without requiring data to be re-exported from the tax return preparation tool. By eliminating the need to re-export the data, the tax planner may considerably simplify the process of generating tax projections that reflect the impact of various pieces of tax legislation, and may also reduce the probability that an existing tax return is inappropriately modified (as might occur if a tax return has to be re-accessed or re-opened to re-export the data, or if a locked tax return has to be unlocked to re-export the data). If the input indicates that the tax projection is to exclude the impact of the specified legislation, the tax planner is configured to prepare the tax projection without including the impact of the specified legislation.

In one embodiment, the tax planner provide one or more toggle mechanisms configured to allow a user to indicate whether specified legislation is to be considered when preparing a tax projection: for example, a checkbox or "yes/no" choice buttons may be provided for each piece of tax legislation being considered. When multiple pieces of tax legislation are applicable to a tax projection, individual toggle mechanisms corresponding to each piece of tax legislation may be provided, allowing a user to isolate the effects of any desired combination of the multiple pieces of tax legislation on the tax projection. A tax projection may correspond to a future tax period, or may be prepared to determine the impact of recently-enacted legislation on an already-filed tax return, e.g., to determine whether an amended version of the tax return for a current tax year should be filed. In some embodiments, at least some of the legislation whose impact is to be considered in generating the tax projection may not yet have been enacted into law: e.g., the tax planner may be configured to take the effect of proposed legislation into account.

In one embodiment, the tax planner may be configured to provide a notification to a user indicative of new tax legislation: e.g., a pop-up window or alert mechanism on a graphical user interface may indicate to the user that an updated version or updated module of the tax planner is available, where the updated version is configurable to include the impact of the new tax legislation in preparing tax projections. The tax planner may also provide an interface allowing a user to respond to the notification by requesting that the update be obtained, e.g., via downloading, and applied to the tax planner. In some embodiments, updates in the form of independently pluggable modules may be provided corresponding to each piece of tax legislation or to specific combinations of tax legislation.

DETAILED DESCRIPTION OF EMBODIMENTS

Figure 1:
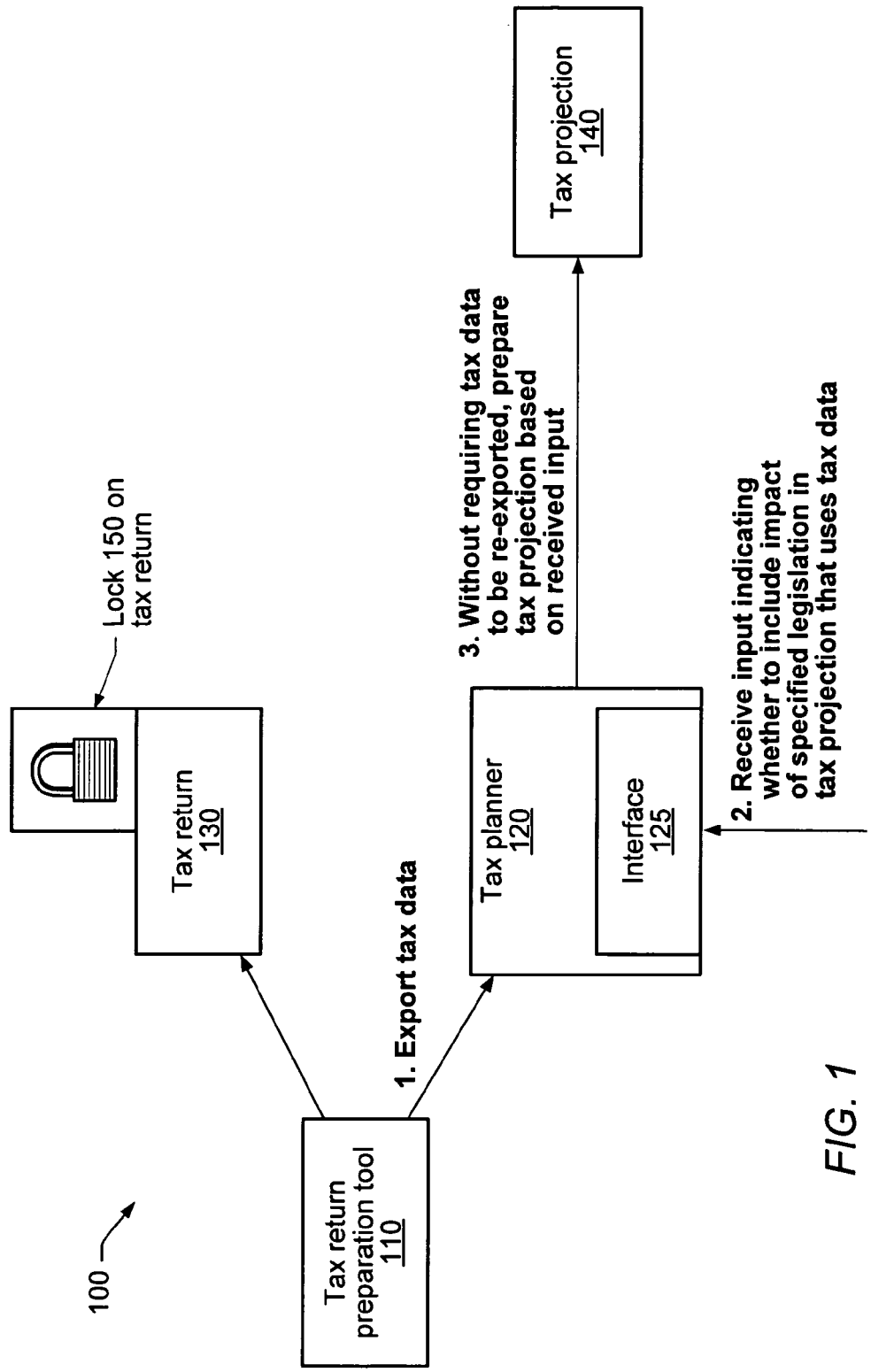
FIG. 1 is a block diagram illustrating one embodiment of a system.

FIG. 1 is a block diagram illustrating one embodiment of a system 100. The system includes a tax return preparation tool 110 and a tax planner 120. The tax return preparation tool 110 is configured to receive data such as wages, tax withholding, investment income, or other information related to the filing of taxes, corresponding to a taxpayer (such as an individual, a married couple filing taxes jointly, or a business entity such as a corporation) and to prepare tax return 130 using the received data. In some embodiments, the tax return preparation tool 110 may provide functionality to lock tax returns, for example in order to prevent any unwanted or unauthorized changes. In one such embodiment, a tax return 130 may be locked (e.g., using lock 150) at any desired stage during the tax return preparation and filing process: e.g., if the preparation of the tax return 130 takes several sessions of user input and interaction, the tax return 130 may be locked after each session and unlocked at the start of the next session. After the tax return 130 has been fully filled out, checked for correctness and/or filed with the appropriate tax authority such as the Internal Revenue Service of the United States, the tax return 130 may also be locked, so that, for example, an accurate record of the tax return as filed may be maintained.

The tax return preparation tool 110 is also configured to export tax-related data to the tax planner 120 to assist tax planner 120 in generating tax projections or tax plans, as indicated by the arrow labeled "1" in FIG. 1. In various embodiments, the exported data may include raw data elements received as input by tax return preparation tool 110 (such as wages, interest and dividend amounts, etc.) and/or computed data elements that are derived or calculated by the tax return preparation tool 110 during the preparation of tax return 130 (such as total tax deductions, capital gains tax liability, total tax liability or refund, etc.). The data may be exported, for example in response to a command issued by a user of tax return preparation tool 110, at any suitable time during or after the tax return preparation and filing process. In some embodiments where locking of tax returns is supported, a tax return 130 may have to be unlocked in order to export data to the tax planner. In one embodiment, data corresponding to a plurality of tax returns (e.g., data used to prepare respective tax returns for several consecutive tax periods) may be exported to tax planner 120, either in response to a single export command or in response to a series of export commands.

Tax planner 120 (which may also be referred to herein as a "tax planning tool") may use the data exported from the tax return preparation tool 110, as well as user input indicating scenarios for which tax information is to be estimated, to prepare one or more tax projections 140. A tax projection 140 may include estimates of various taxation-related quantities for future, current or even past tax periods based on specified sets of assumptions for each scenario. For example, in one embodiment, a user may provide assumptions about estimated changes in various tax-related line items for a future tax year, such as wage increases, changes in tax-deductible health-care related expenses, and the like, and tax planner 120 may generate a tax projection indicating how the changes would affect total tax liability or refund amounts. Tax planner 120 may provide a variety of interfaces and mechanisms for users to specify scenarios and assumptions for which tax projections 140 are to be prepared: for example, in some implementations, users may be asked to provide absolute values of tax-related quantities such as wages for each scenario, while in other implementations, users may provide percentage change values for various quantities. In one implementation, in which for example the tax planner 120 has received data used to prepare tax returns for two or more consecutive tax periods from the tax return preparation tool 110, a user may specify that the tax planner 120 analyze the received data to prepare a tax projection 140 based on trends detected between the two or more consecutive tax periods. For example, if the wages of a taxpayer for tax year 2002 were $80,000, and the wages for tax year 2003 were $84,000, indicating a 5% year-to-year increase in wages, and the taxpayer instructs the tax planner 120 to prepare a tax projection 140 for 2004 using the tax data for the years 2002 and 2003 as a guide, the tax planner may construct a scenario in which the wages again increase by 5% from $84,000 in 2003 to $88,200 in 2004. Thus, in various embodiments, the scenarios and assumptions for which a tax projection 140 is prepared may be either explicitly specified by users, or generated at least partly by tax planner 120.

In one embodiment, where for example a particular tax law becomes effective after a taxpayer has already filed a tax return for a particular tax year, the tax planner 120 may be used to generate a tax projection 140 for that same tax year, and the projection may be used to determine whether an amended return should be filed for the tax year—for example, if the tax projection indicates that the new tax law has no impact on the tax return, an amended return may not be required. Tax projections 140 may be provided or displayed to users in a variety of different formats in various embodiments: e.g., as rows and columns within a spreadsheet-like interface, as one or more graphical objects such as pie charts or bar graphs on a graphical user interface (GUI), in the form of a text report, etc. A tax projection may also be referred to herein as a "tax plan". The tax planner 120 may be configured to produce tax projections in real time in some embodiments: e.g., as soon as a user provides a new set of assumptions (such as a wage change), the tax planner 120 may immediately display a recalculated tax projection corresponding to the combination of the new set of assumptions and the exported data previously received from the tax return preparation tool 110, without requiring the user to wait for more than a few seconds.

Tax-related legislation can often have a significant impact on the calculations of tax planner 120 as well as tax return preparation tool 110. Tax-related legislation may be enacted or considered for enactment at a number of different legislative levels, such as at a national level, a state or province level, a district level, a city level, etc. Each piece of legislation or "act" may impact one or more tax-related quantities or line items in a tax projection 140 or a tax return 130: e.g., one act may change the maximum rate of taxation for capital gains, another act may change the income levels corresponding to various income tax rates in a particular tax jurisdiction, another may change the maximum allowable amount of tax deductions of a particular type (e.g., charitable contribution deductions) that are to be allowed, etc. Since tax-related software tools such as tax return preparation tool 110 and tax planner 120 may often be developed and released for public use according to schedules that are not tied to legislative schedules, tax-related legislation may sometimes be passed after a major release of a tax-related software tool such as tax planner 120. The impact of various proposed or enacted pieces of tax legislation on tax projections 140 may differ: for example, one piece of legislation may result in an increase in tax liability, while another piece of tax legislation may result in a decrease in tax liability. In the embodiment depicted in FIG. 1, after the data is exported from the tax return preparation tool 110 to the tax planner 120, the tax planner 120 is configured to receive input indicating whether a tax projection 140 is to include an impact of specified legislation, as indicated by the arrow labeled "2". In one embodiment, the input may be received via interface 125. In such an embodiment, interface 125 may be configured to display information (such as a descriptive name, an enactment date, etc.) regarding one or more pieces of legislation whose impact a user may consider for inclusion in the tax projection, and may allow the user to provide input specifying whether the impact of any desired combination of the pieces of legislation are to be included in the tax projection, as described below in further detail in conjunction with the description of FIG. 2.

As indicated by the arrow labeled "3" in FIG. 1, the tax planner may be configured to generate a tax projection 140 in accordance with the input received via interface 125, without requiring any data to be re-exported from the tax return preparation tool 110, and without requiring the tax return 130 (prepared using the previously exported data) to be unlocked if it is locked at the time that the input is received via interface 125. Thus, if the input received indicates that the tax projection 140 is to include the impact of specified legislation, the tax planner 120 may prepare a tax projection 140 that includes the impact of the specified legislation; and if the input indicates that the tax projection 140 is not to include the impact of specified legislation, tax planner 120 may prepare a tax projection that excludes the impact. In either case (i.e., whether the impact of specified legislation is included or excluded from tax projection 140), none of the data or tax returns managed or created by the tax return preparation tool 110 may need to be accessed, modified or re-exported to the tax planner 120 in order for the tax planner 120 to prepare the tax projection 140 in the depicted embodiment. Thus, in such an embodiment, after the initial export of data from the tax return preparation tool 110 to the tax planner 120, no further interaction between the tax return preparation tool 110 and the tax planner 120 may be required in order for the tax planner to prepare the tax projection 140. By supporting the capability of generating tax projections 140 without requiring re-export of data from the tax return preparation tool 110 in this way, tax planner 120 may reduce the amount of time and effort required to determine the impact of specific legislation, and may also help reduce the likelihood of inadvertently modifying or corrupting a tax return 130.

It is noted that in some embodiments, tax-related data may be re-exported from the tax return preparation tool 110 after the input is received via interface 125; that is, in such embodiments, a re-export of the data to the tax planner 120 may be permitted, even if it is not required, for the generation of tax projection 140. It is also noted that in some embodiments, the tax return preparation tool 110 may also provide an interface allowing users to indicate whether the impact of specified tax-related legislation is to be considered when preparing tax return 130. In such embodiments, some or all of the data exported from the tax return preparation tool 110 may already reflect the impact of some pieces of tax legislation, but the effects of other legislation (such as legislation enacted into law after the data is exported to the tax planner 120, or legislation not considered for tax return 130) may be applied to tax projection 140 using the techniques described above.

In some embodiments, the interface 125 may comprise a toggle mechanism (e.g., a check box on a web page) that includes at least two settings: a first setting indicating that the impact of the specified legislation is to be included in the tax projection 140, and a second setting indicating that the impact of specified legislation is not to be included in the tax projection 140. A user may switch back and forth between the first and second settings using the toggle mechanism, and corresponding changes to tax projection 140 may be computed rapidly and displayed in real time to the user by tax planner 120. A user may in one embodiment save different versions of tax projection 140 corresponding to respective settings of the toggle mechanism. In some implementations, a plurality of different tax-related line items or quantities may be included within a tax projection 140, and in response to a user's changing the setting on the toggle mechanism, the specific line items whose values change as a result may be highlighted (e.g., within a display or in a report) by tax planner 120.

Figure 2:
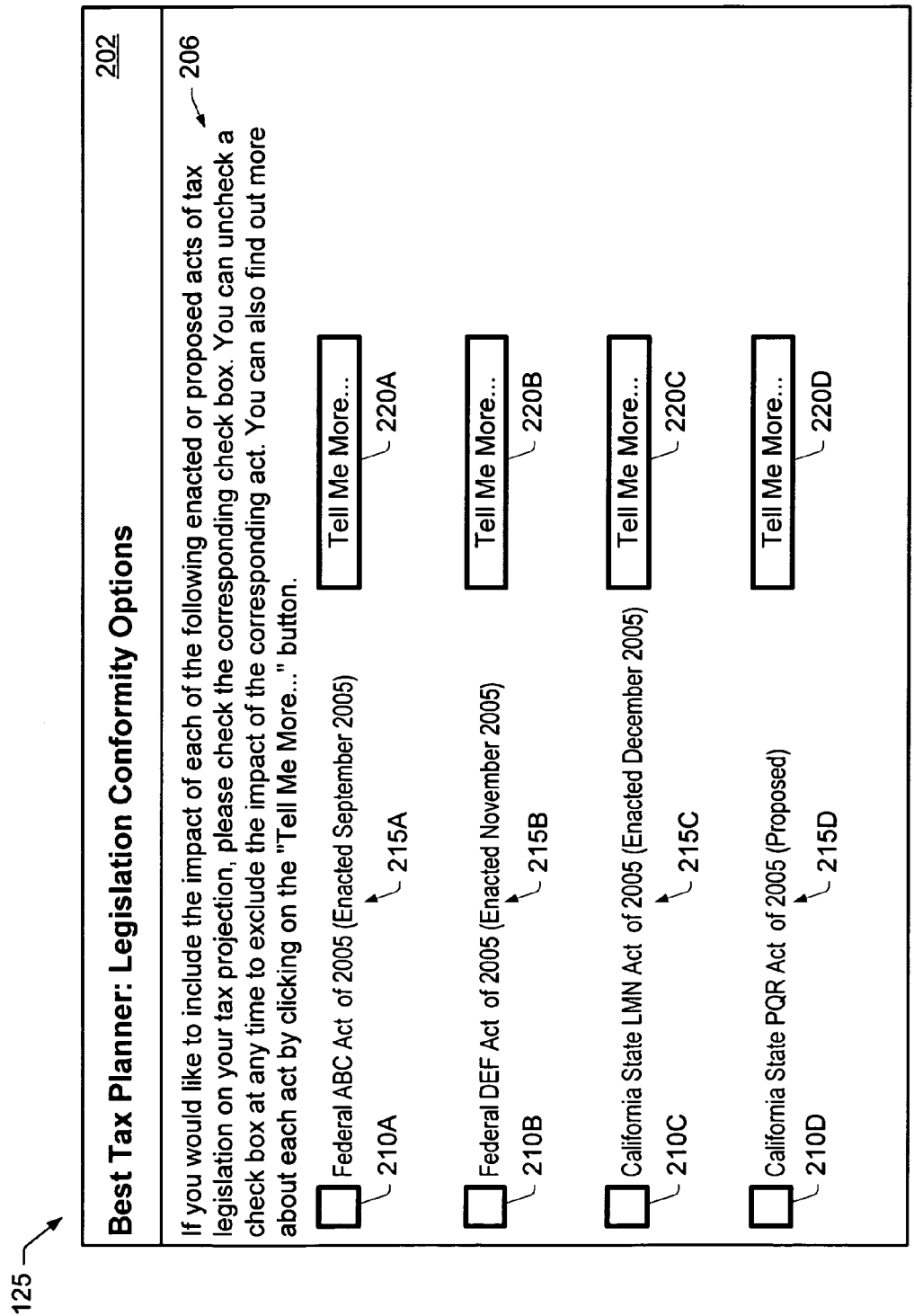
FIG. 2 illustrates an exemplary interface that may be used to provide input to a tax planner indicating which, if any, of one or more tax-related legislative acts or proposals should be considered in the preparation of a tax projection, according to one embodiment.

FIG. 2 illustrates an exemplary interface 125 that may be used to provide input to tax planner 125 indicating which, if any, of one or more tax-related legislative acts or proposals should be considered in the preparation of a tax projection 140, according to one embodiment. The interface 125 may be provided in various formats in different embodiments, e.g., as part of a custom GUI for tax planner 120 in some embodiments, and as a browser-accessible web page in other embodiments. As shown, the interface 125 may comprise a title area 202, which may be used to identify the name of the tax planner 120 (e.g., "Best Tax Planner") as well as the functionality of the interface (e.g., "Legislation Conformity Options"). A plurality of input interface elements, such as checkboxes 210A-210D (collectively referred to herein as checkboxes 210) may be provided, each corresponding to a respective legislative act or proposal. The term "legislative proposal", as used herein, refers to a piece of legislation that has either not yet been enacted or is not yet being enforced, about which sufficient information is known to generate an estimate of the impact of the legislation on a tax projection 140. The interface 125 may include a section of explanatory text, such as text 206, describing how the interface may be used. Information 215 (e.g., 215A-215D) such as a name (e.g., "Federal ABC Act of 2005"), and a date of enactment if applicable (e.g., "September 2005") may be displayed for each piece of legislation that a user may select for inclusion in the tax projection. In one embodiment, the interface 125 may also provide respective interface elements (such as buttons 220A-220D) allowing users to obtain more information about each of the pieces of legislation. By clicking on the buttons 220A-220D, a user may be directed to a variety of additional sources of information regarding the tax legislation in various embodiments—e.g., to a summary of the legislation provided as part of tax planner 120, to an external web page such as a legislature's web site, a newspaper or magazine web site, etc. In some embodiments, interfaces other than the buttons 220A-220D may be used to obtain access to information about the tax legislation: for example, an activation of a function key on a keyboard by a user may generate a window with additional information on the legislation.

In the embodiment depicted in FIG. 2, the separate checkboxes 210 may allow a user to obtain specific tax projections corresponding to various combinations of legislative acts or proposals at various levels of government. In the example shown, which corresponds to United States tax jurisdictions, two pieces of tax-related legislation at the federal level are listed, each with a corresponding toggle or check box 210: "Federal ABC Act" corresponding to identifying numeral 215A, and "Federal DEF Act" (215B). In addition, two pieces of tax-related legislation at the state level are listed "California State LMN Act" (215C) and "California State PQR Act" (215D). By checking or unchecking the corresponding checkboxes 220A-220D, a user may rapidly determine the specific tax impact of 16 different combinations of tax legislation. For example, in one scenario, the user may check boxes 220A and 220B and leave boxes 220C and 220D unchecked to determine the impact of the federal tax legislation and exclude the impact of either state tax legislation; and in another scenario, the user may check all four boxes to determine the impact of all of the pieces of legislation. As indicated in description 215D, some of the legislation may not yet have been enacted into law; thus a user may proactively estimate the impact of proposed legislation on the user's tax liability, and may as a result take some action either to support passage of the proposed legislation (e.g. by sending e-mail to one or more legislators) or to oppose passage of the proposed legislation. In various embodiments, the tax planner 120 may be configured to determine exactly which pieces of legislation apply to a particular user, e.g., based on the user's resident state (which may be supplied directly to tax planner 120 by the user or may be part of the data exported from tax return preparation tool 110 to tax planner 120). For example, in the depicted example, tax planner 120 has determined that the user is a resident of the state of California; if, instead, the tax planner 120 had determined that the user is a resident of the state of New York, entries 215C and 215D would not be shown, and may have been replaced by New York-specific entries. It is noted that although in the embodiment shown in FIG. 2, checkboxes corresponding to each piece of tax legislation are shown, in other embodiments different input interface elements such as "yes/no" buttons, radio buttons, etc., may be implemented instead. In some embodiments, non-graphical user interfaces, such as text commands, may be used to specify the pieces of legislation whose impact is to be considered.

In some embodiments, the techniques described above may be applied not just with respect to legislative acts or proposals that may affect taxation, but also (or alternatively) with respect to other types of governmental regulations or actions that may affect taxation, such as, rule changes by a taxing authority, court rulings, expirations or phase-outs of rules or laws that were in effect for a limited period of time, "letter rulings" by taxing authorities that may affect multiple taxpayers, etc. For example, in one embodiment, a toggle mechanism may be implemented to allow a user to indicate whether the potential impact of a tax-related court ruling should be included or excluded from a tax projection. It is also noted that toggle mechanisms and other concepts similar to those described herein may also (or alternatively) be included in other financial planning tools in some embodiments, e.g., in retirement planning tools, real estate management planning tools, and the like, where changes in governmental regulations (including legislative changes as well as non-legislative changes) may potentially affect financial projections. For example, a retirement plan (e.g., a plan that indicates to a user how much the user should save every month in order to be able to retire with a desired financial standard of living) may be affected by proposed legislation that changes the retirement age and/or retiree medical benefit levels (such as Medicare payments in the United States), and a mechanism may therefore be implemented in a retirement planning tool to allow a user to include or exclude the impact of the proposed legislation. While embodiments are generally described herein in terms of taxation and legislative changes, these are but example embodiments. In general, the concepts described herein may apply to any sort of planning and in regard to changes in any type of governmental requirement.

Figure 3:
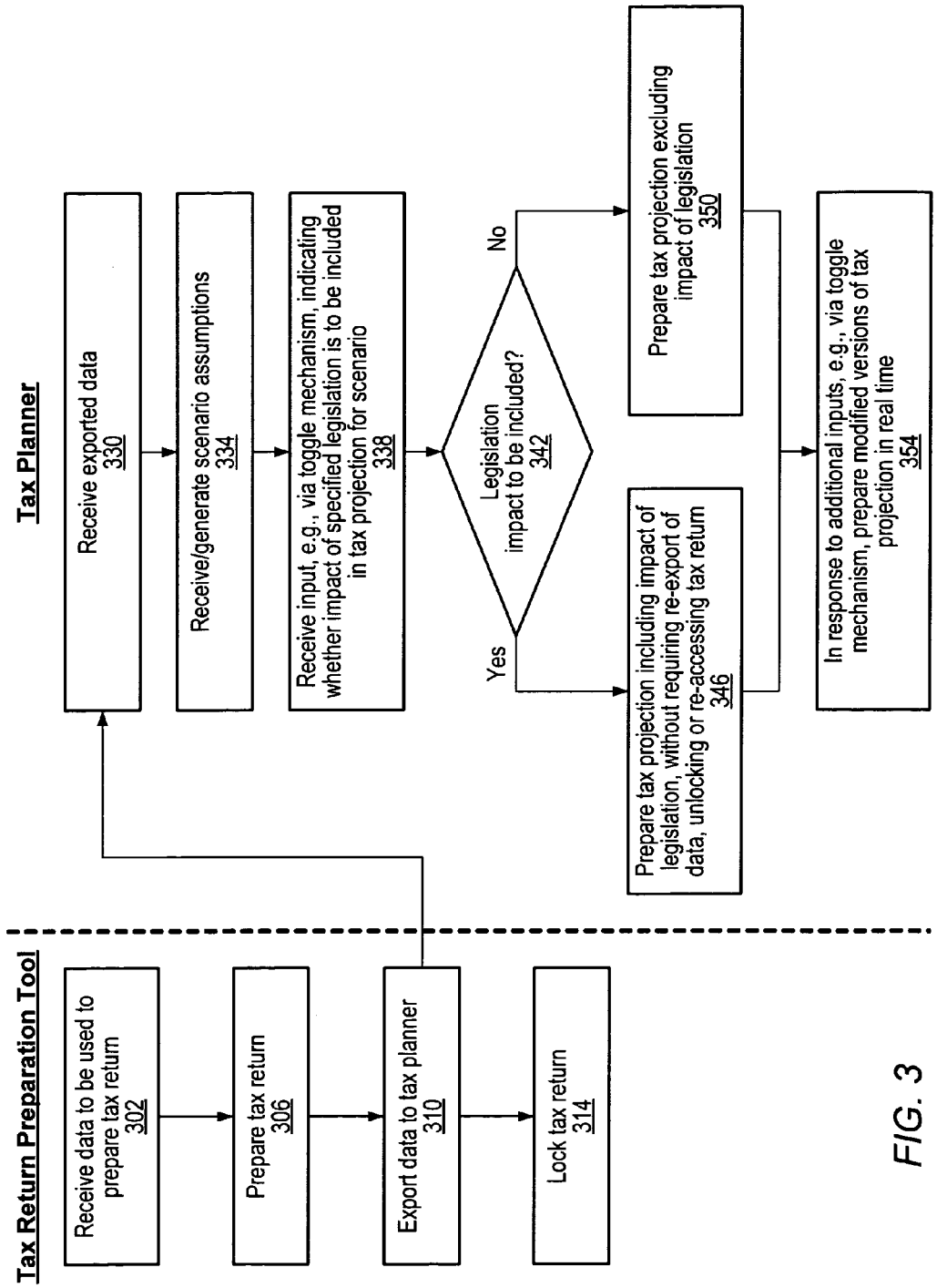
FIG. 3 is a flow chart illustrating aspects of the operation of a tax return preparation tool and a tax planner according to one embodiment.

FIG. 3 is a flow chart illustrating aspects of the operation of tax return preparation tool 110 and tax planner 120 according to one embodiment. Operations of the tax return preparation tool are illustrated to the left of the dotted line, and operations of the tax planner to the right of the dotted line. As shown in block 302 of FIG. 3, the tax return preparation tool 110 may be configured to receive data for use in preparing tax return 130. The data may be received from a variety of sources in different embodiments: e.g., a user may manually enter the data, or the tax return preparation tool 110 may obtain at least some of the data over a network without requiring manual data entry, e.g., by connecting to various web sites such as brokerage company web sites, bank web sites, etc. The user may provide respective authentication information (such as a user name and a password) for each web site to the tax return preparation tool 110 in some embodiments to allow the tool to extract the data from the web site. After the data has been received, the tax return preparation tool 110 may be configured to prepare tax return 130 (block 306 of FIG. 3). In the depicted embodiment, at least a portion of the data used to prepare the tax return 130 is exported from the tax return preparation tool 110 to the tax planner 120 (block 310) after the tax return 130 is prepared, and the tax return 130 is then locked (block 314). In other embodiments, the sequence in which operations corresponding to blocks 306, 310 and 314 may differ: e.g., the tax return may be locked at various times before it is fully filled out, the data may be exported before the tax return is completed or after it is locked, etc.

The tax planner 120 is configured to receive the data exported from the tax return preparation tool 110 (block 330). In addition, the tax planner may receive input specifying the scenario and assumptions for which a tax projection 140 is to be generated, or may generate the scenario and/or assumptions based on user instruction (block 334). After receiving the exported data, the tax planner may receive input, e.g., via an interface 125 that comprises one or more toggle mechanisms such as checkboxes 210, indicating whether the impact of specified legislation is to be included in a tax projection 140 to be prepared using the exported data (block 338). The specified legislation may include a combination of a plurality of different legislative acts or proposals in some embodiments, as described above in conjunction with FIG. 2. If the input indicates that the impact of the specified legislation is to be included (as determined in decision block 342), tax planner 120 may include the impact in preparing the tax projection 140, without requiring any data to be re-exported from the tax return preparation tool 110, and without requiring tax return 130 to be unlocked or re-accessed (block 346). If the input indicates that the impact of the specified legislation is to be excluded (as also determined in decision block 342), the tax planner may exclude the impact of the legislation when producing the tax projection 140 (block 350). It is noted that the order in which operations corresponding to blocks 330, 334 and 338 are performed may differ in some embodiments from the order illustrated in FIG. 3: for example, in one embodiment, a user may first provide input indicating whether specified legislation is to be considered in generating a tax projection 140, and then provide input defining the assumptions and scenario for which the tax projection is to be prepared.

In the embodiment shown in FIG. 3, the tax planner may receive additional inputs (e.g., via interface 125) after a tax projection is first created, where the additional inputs may for example specify a different combination of legislative acts and/or proposals, and the tax planner may generate modified versions of the tax projection according to the additional inputs in real time (block 354). For example, a user may switch back and forth between toggle settings, and modified versions of the tax projections may be rapidly generated, corresponding to each selected setting or combination of settings. In some embodiments, e.g., in order to preserve the ability of the tax planner 120 to re-compute tax projections 140 in real time, some advanced features such as depreciation-related features (e.g., features that may be included in tax return preparation tool 110) may be excluded from the tax planner 120. In such embodiments, if a particular tax projection 140 requires the use of the advanced features, the tax planner 120 may indicate to the user that data related to the advanced features may have to be re-exported from the tax return preparation tool 110 after an impact of the specified legislation is taken into account by the tax return preparation tool 110—i.e., the tax planner 120 may rely on advanced functionality provided by the tax return preparation tool 110 to prepare portions of some tax projections 140. In one embodiment, the tax planner 120 may simply indicate to a user that data corresponding to an advanced feature is not included within the set of data exported from the tax return preparation tool 110, and may not explicitly indicate that a re-export is required. The user may then determine whether a recalculation, a re-export and/or any other action related to the advanced feature is to be performed.

Figure 4:
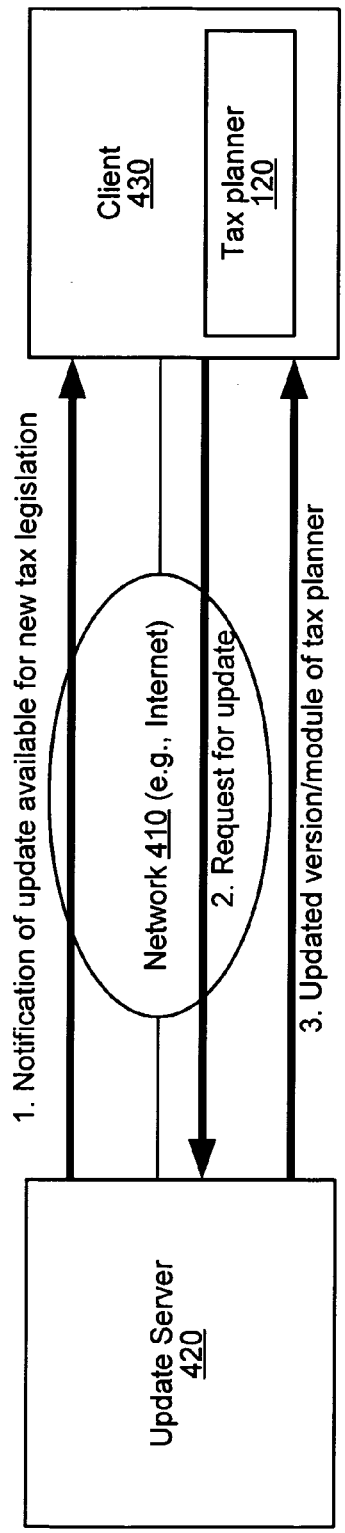
FIG. 4 is a block diagram illustrating an embodiment in which a tax planner executing at a client computer system is configured to communicate with a remote update server over a network to receive an update corresponding to new tax legislation.

In some embodiments, the tax planner 120 may be configured to notify users when new tax legislation is enacted or proposed, and provide an interface allowing the users to update their tax planner to enable the impact of new tax legislation to be considered when preparing tax projections 140. FIG. 4 is a block diagram illustrating an embodiment in which a tax planner 120 executing at a client computer system 430 is configured to communicate with an update server 420 over a network 410 to receive an update corresponding to new tax legislation. In the depicted embodiment, the tax planner 120 may be configured to connect to the update server 420, e.g., via a TCP/IP network connection over the Internet, when the tax planner is activated and/or after receiving permission from the user. The update server 420 may be hosted, for example, at a web site managed by the software vendor responsible for developing the tax planner 120. As shown by the arrow labeled "1" in FIG. 4, the update server may be configured to send a notification to the tax planner indicating that new tax legislation has been enacted or proposed, and that an update (such as a pluggable module implementing the changes necessitated by the new tax legislation) to the tax planner is available. The update server 410 may also send notifications of other updates to the tax planner 120 in some embodiments, including for example bug fixes and enhanced features.

In response to receiving the notification from the update server, the tax planner 120 may in some embodiments indicate to the user that an update capable of taking the new tax legislation into account is available. For example, a pop-up window on a GUI (possibly accompanied by a sound effect) may be used to notify a user in some implementations. The tax planner 120 may also provide an interface allowing a user to request the update, e.g., via a download of the update from a software vendor's web site. If the user provides input requesting that the update be downloaded, a request for the update may be sent from the client 430 to the update server 420 over network 410, as indicated by the arrow labeled "2" in FIG. 4. In response to the request, the update may be sent by the update server 420 to the client 430, as indicated by the arrow labeled "3" in FIG. 4.

Figure 5:
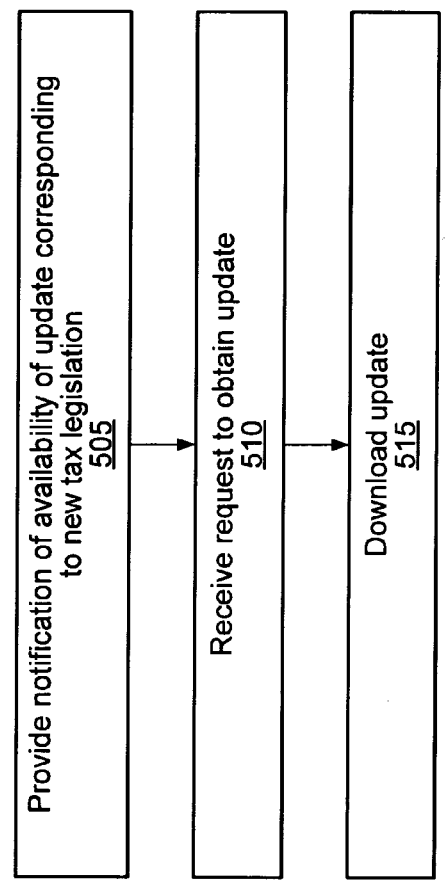
FIG. 5 is a flow diagram illustrating aspects of the operation of a tax planner in an embodiment where the tax planner is configured to notify a user when an update corresponding to new tax legislation becomes available.

FIG. 5 is a flow diagram illustrating aspects of the operation of tax planner 120 in an embodiment where the tax planner is configured to notify a user when an update corresponding to new tax legislation becomes available. The tax planner may be configured to provide the notification of the availability of the update to the user (block 505 of FIG. 5), e.g., in response to a message received from an update server 420. The tax planner may receive a request from the user in response to the notification, requesting a download of the update (block 510), and may then proceed to download the update from the update server (block 515). It is noted that in some embodiments, the updates may be automatic and may not require user notification or approval: for example, in one implementation, a user may be asked to agree to allow automatic updates of the tax planner when updates become available, and updates may be downloaded automatically if the user agrees.

Figure 6:
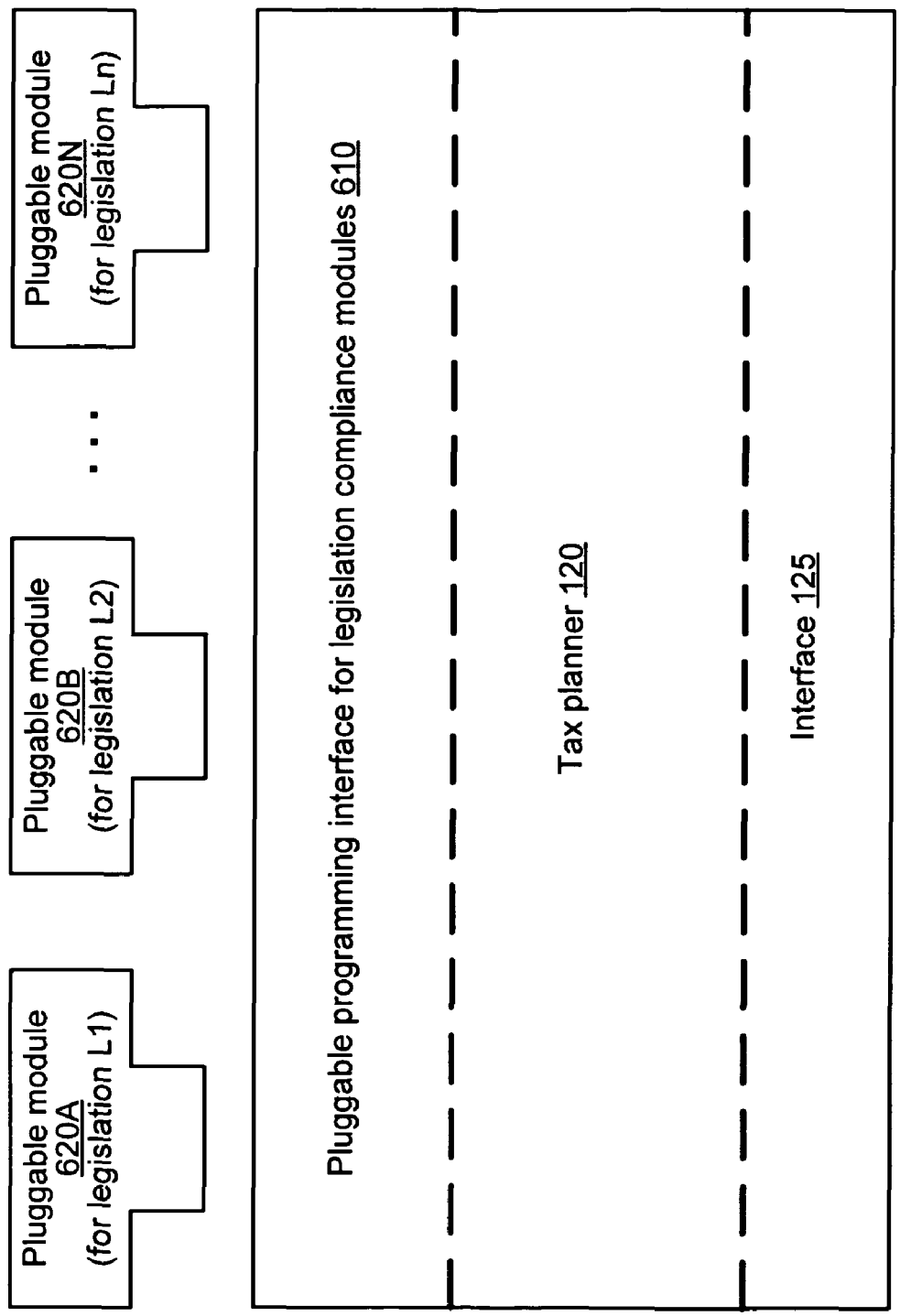
FIG. 6 illustrates an embodiment in which a tax planner comprises a pluggable programming interface for legislation compliance modules.

FIG. 6 illustrates an embodiment in which tax planner 120 comprises a pluggable programming interface 610 for legislation compliance modules. The pluggable programming interface 610 may allow a plurality of independently pluggable modules 620, such as modules 620A-620N, each corresponding to respective tax laws L1-Ln, to be plugged in to the tax planner, and/or to be deleted from the tax planner, without for example affecting or requiring any changes in the rest of the software included within the tax planner 120. Each of the pluggable modules 620 may be compatible with the pluggable programmable interface 610, and each may perform respective computations allowing the tax planner to include the impact of the corresponding legislation when preparing tax projections. Each pluggable module 620 may be developed and/or deployed independently of the others. By implementing the pluggable programming interface 610 and the pluggable modules 620 to isolate legislation-related updates, the amount of development and testing effort required to update tax planner 120 may be significantly reduced in some embodiments, compared to the effort that may be required in architectures where significant portions of the tax planner code had to be modified for each new piece of tax legislation.

It is noted that in some embodiments, new releases of tax planner 120 may be prepared each tax year, each reflecting the state of tax law as of a particular point in time. Thus, tax planner code changes corresponding to tax legislation that is "new" with respect to one tax year may be incorporated into the core tax planner code for subsequent tax years in such embodiments, thus eliminating the need to retain pluggable modules 620 from year to year, or at least reducing the total number of pluggable modules 620 retained from year to year. Similarly, in some such embodiments, the legislation choices displayed in interface 125 (such as the choices illustrated in FIG. 2) may not be carried over from year to year as the changes corresponding to the various pieces legislation either become part of the core functionality of the tax planner 120 or are eliminated (e.g., if proposed tax legislation such as the "California State PQR Act" 215D of FIG. 2 is withdrawn from further legislative action).

Figure 7:
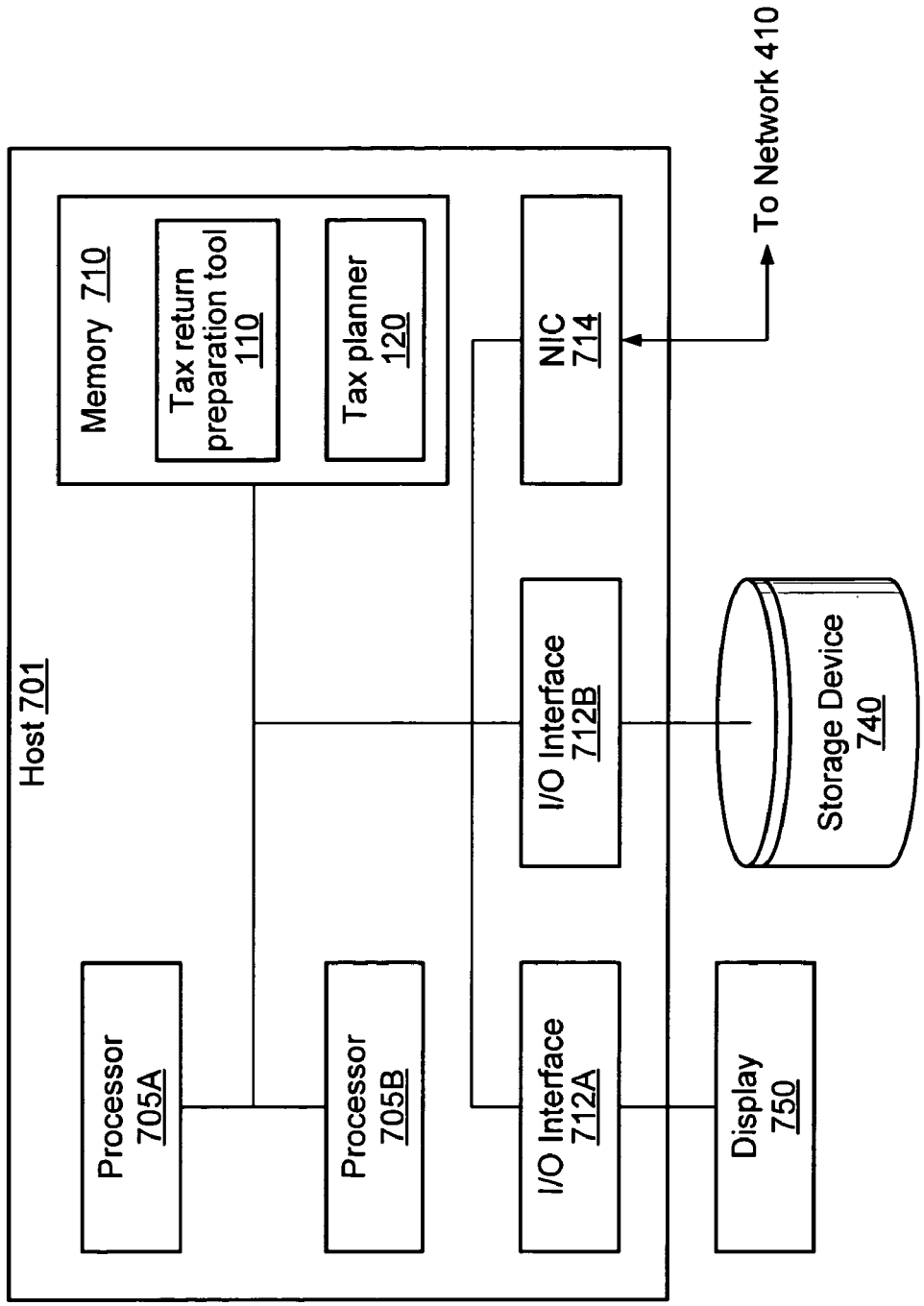
FIG. 7 is a block diagram illustrating constituent elements of a computer host, according to one embodiment While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

FIG. 7 is a block diagram illustrating constituent elements of a computer host 701 at which at least a portion of tax planner 120 and/or tax return preparation tool 110 may be executed, according to one embodiment. Host 701 may include one or more processors 705 (e.g., 705A and 705B) implemented using any desired architecture or chip set, such as the SPARC™ architecture, an x86-compatible architecture from Intel Corporation, Advanced Micro Devices, or an other architecture or chipset capable of processing data. Any desired operating system may be run on the host 701, such as various versions of Unix, Linux, Windows™ from Microsoft Corporation, MacOS from Apple Corporation, or any other operating system that enables the operation of software on a hardware platform. Program instructions that may be executable to implement the functionality of tax planner 120 and/or tax return preparation tool 110 described above may be partly or fully resident within a memory 720 at the host 701 at any given point in time, and may also be stored on a storage device 740 such as a disk or disk array accessible from the processors. In various embodiments, each of tax planner 120 and/or tax return preparation tool 110 may be packaged as a standalone application, or may be packaged along with a suite of other software tools. The memory 720 used to store the program instructions may be implemented using any appropriate medium such as any of various types of RAM (e.g., DRAM, SDRAM, RDRAM, SRAM, etc.). In addition to processors and memory, the host 701 may also include one or more I/O interfaces 712, such as I/O interface 712A providing access to storage devices 740 and I/O interface 712B providing access to display 750. In addition, host 701 may include one or more network interfaces 714 providing access to a network 410 that may, for example, be used to connect to an update server 420 (of FIG. 4). Any of a variety of storage devices 740 may be used to store the program instructions as well as application data in different embodiments, including any desired type of persistent and/or volatile storage devices, such as individual disks, disk arrays, optical devices such as CD-ROMs, CD-RW drives, DVD-ROMs, DVD-RW drives, flash memory devices, various types of RAM, holographic storage and the like. It should be noted that one or more components of host 701 may be located remotely and accessed via a network. Tax planner 120 and tax return preparation tool 110 may be implemented in various embodiments using any desired programming language or combination of programming languages, e.g., C, C++, C#, Java™, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for preparing tax liability projections, comprising:
   a processor;
   a tax planning tool executing on the processor and configured to:
      obtain a previously filed tax return comprising tax data;
      generate a tax assumption for a future year related to a line item of the previously filed tax return;
      receive an update comprising a first new tax legislation and a second new tax legislation impacting the line item of the previously filed tax return;
      receive a selection from a user of the first new tax legislation and the second new tax legislation;
      calculate a first impact of the first new tax legislation and a second impact of the second new tax legislation;
      calculate a first tax liability projection based on the tax data, the tax assumption, the first impact of the first new tax legislation, and the second impact of the second new tax legislation;
      receive a de-selection from the user of the second new tax legislation that excludes the second impact of the second new tax legislation from the first tax liability projection;
      recalculate, after receiving the de-selection, the first tax liability projection based on the tax data, the tax assumption, and only the first impact of the first new tax legislation to generate a second tax liability projection;
      prepare an amendment to modify the previously filed tax return based on the second tax liability projection; and
      file the amendment with a tax authority.

2. A method for preparing tax liability projections, comprising:
   obtaining, by a processor, a previously filed tax return comprising tax data;
   generating, by the processor, a tax assumption for a future year related to a line item of the previously filed tax return;
   receiving, by the processor, an update comprising a first new tax legislation and a second new tax legislation impacting the line item of the previously filed tax return;
   receiving, by the processor, a selection from a user of the first new tax legislation and the second new tax legislation;
   calculating, by the processor, a first impact of the first new tax legislation and a second impact of the second new tax legislation;

calculating, by the processor, a first tax liability projection based on the tax data, the tax assumption, the first impact of the first new tax legislation, and the second impact of the second new tax legislation;

receiving, by the processor, a de-selection from the user of the second new tax legislation that excludes the second impact of the second new tax legislation from the first tax liability projection;

recalculating, after receiving the de-selection and by the processor, the first tax liability projection based on the tax data, the tax assumption, and only the first impact of the first new tax legislation to generate a second tax liability projection;

preparing an amendment to modify the previously filed tax return based on the second tax liability projection; and filing the amendment with a tax authority.

3. A computer readable storage medium storing instructions for preparing tax liability projections, the instructions executable on a processor and comprising functionality for:

obtaining a previously filed tax return comprising tax data;

generating a tax assumption for a future year related to a line item of the previously filed tax return;

receiving an update comprising a first new tax legislation and a second new tax legislation impacting the line item of the previously filed tax return;

receiving a selection from a user of the first new tax legislation and the second new tax legislation;

calculating a first impact of the first new tax legislation and a second impact of the second new tax legislation;

calculating a first tax liability projection based on the tax data, the tax assumption, the first impact of the first new tax legislation, and the second impact of the second new tax legislation;

receiving a de-selection from the user of the second new tax legislation that excludes the second impact of the second new tax legislation from the first tax liability projection;

recalculating, after receiving the de-selection, the first tax liability projection based on the tax data, the tax assumption, and only the first impact of the first new tax legislation to generate a second tax liability projection;

preparing an amendment to modify the previously filed tax return based on the second tax liability projection; and filing the amendment with a tax authority.

4. The system of claim 1, wherein the tax data and the previously filed tax return originate from to a first tax period, and wherein the first tax liability projection and the second tax liability projection are calculated in a second tax period after the first tax period.

5. The system of claim 1, wherein the second tax liability projection estimates an impact of the first new tax legislation on the line item of the previously filed tax return.

6. The system of claim 1, wherein the first new tax legislation comprises proposed legislation that has not yet been enacted into law.

7. The system of claim 1, wherein the tax planning tool is further configured to:

provide a notification to a user indicating the first new tax legislation.

8. The method of claim 2, wherein the first new tax legislation comprises proposed legislation that has not yet been enacted into law.

9. The computer readable storage medium of claim 3, wherein the first new tax legislation comprises proposed legislation that has not yet been enacted into law.

10. The system of claim 1, wherein the tax planning tool is further configured to:

receive, from the user, the tax assumption that impacts a future line item of the amendment, wherein the tax assumption is a wage increase.

11. The system of claim 1, wherein the tax planning tool is further configured to:

determine that the first new tax legislation is related to a federal legislative level; and determine that the second new tax legislation is related to a state legislative level.

12. The system of claim 1, wherein the tax planning tool is further configured to:

determine that the second tax liability projection modifies the line item of the previously filed tax return; and replace the previously filed tax return with the amendment.

13. The system of claim 1, wherein the tax planning tool is further configured to:

determine that the second new tax legislation was enacted after the previously filed tax return was filed.

14. The method of claim 2, further comprising:

receiving, from the user, the tax assumption that impacts a future line item of the amendment, wherein the tax assumption is a wage increase.

15. The method of claim 2, further comprising:

determining that the first new tax legislation is related to a federal legislative level; and determining that the second new tax legislation is related to a state legislative level.

16. The method of claim 2, further comprising:

determining that the second tax liability projection modifies the line item of the previously filed tax return; and replacing the previously filed tax return with the amendment.

17. The method of claim 2, further comprising:

determining that the second new tax legislation was enacted after the previously filed tax return was filed.

18. The method of claim 2, further comprising:

calculating the difference between the first tax liability projection and the second tax liability projection.

19. The method of claim 2, further comprising:

determining that the first new tax legislation impacts the capital gains of the previously filed tax return.

20. The computer readable storage medium of claim 3, the instructions further comprising functionality for:

receiving, from the user, the tax assumption that impacts a future line item of the amendment, wherein the tax assumption is a wage increase.

21. The computer readable storage medium of claim 3, the instructions further comprising functionality for:

determining that the first new tax legislation is related to a federal legislative level; and determining that the second new tax legislation is related to a state legislative level.

22. The computer readable storage medium of claim 3, the instructions further comprising functionality for:

determining that the second tax liability projection modifies the line item of the previously filed tax return; and replacing the previously filed tax return with the amendment.

23. The computer readable storage medium of claim 3, the instructions further comprising functionality for:

determining that the second new tax legislation was enacted after the previously filed tax return was filed.

* * * * *